(12) United States Patent
Moreno

(10) Patent No.: US 6,758,478 B1
(45) Date of Patent: Jul. 6, 2004

(54) ELASTOMERIC SEAL ANTI-EXTRUSION WEDGE BACKUP RING AND FLANGE

(75) Inventor: Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/339,951

(22) Filed: Jan. 10, 2003

(51) Int. Cl.[7] .............................................. F16J 15/16
(52) U.S. Cl. ...................................... 277/584; 277/587
(58) Field of Search ................................ 277/584, 587

(56) References Cited

U.S. PATENT DOCUMENTS

| | | | | |
|---|---|---|---|---|
| 1,331,216 A | * | 2/1920 | Schneider | 277/562 |
| 1,710,203 A | * | 4/1929 | Burstall | 166/130 |
| 2,456,356 A | * | 12/1948 | Aber | 277/584 |
| 2,494,598 A | * | 1/1950 | Waring | 277/584 |
| 2,513,533 A | * | 7/1950 | Thornhill | 277/556 |
| 2,616,731 A | * | 11/1952 | Osmun | 277/584 |
| 2,705,177 A | * | 3/1955 | Waring | 277/438 |
| 2,739,855 A | * | 3/1956 | Bruning | 277/584 |
| 3,097,855 A | * | 7/1963 | Allen | 277/584 |
| 3,132,869 A | * | 5/1964 | Campbell | 277/584 |
| 3,269,737 A | * | 8/1966 | Freese | 277/587 |
| 3,323,806 A | * | 6/1967 | Smith et al. | 277/589 |
| 3,584,884 A | * | 6/1971 | Fuchs, Jr. | 277/589 |
| 3,606,356 A | * | 9/1971 | Beroset | 277/584 |
| 3,765,690 A | * | 10/1973 | Sievenpiper | 277/556 |
| 3,774,978 A | | 11/1973 | Staunton et al. | |
| 3,877,707 A | * | 4/1975 | Syvakari | 277/587 |
| 4,079,948 A | * | 3/1978 | Paureau | 277/587 |
| 4,352,498 A | | 10/1982 | Burke et al. | |
| RE31,171 E | * | 3/1983 | Brent | 277/584 |
| 4,747,614 A | | 5/1988 | Kuroyanagi et al. | |
| 4,802,696 A | | 2/1989 | Chohan et al. | |
| 4,893,878 A | | 1/1990 | Cole et al. | |
| 4,922,715 A | | 5/1990 | Furumoto et al. | |
| 5,086,867 A | | 2/1992 | Hirota et al. | |
| 5,092,609 A | * | 3/1992 | Balzano et al. | 277/589 |
| 5,344,118 A | | 9/1994 | Kamiya et al. | |
| 6,173,965 B1 | * | 1/2001 | Niessen | 277/584 |
| 6,173,968 B1 | * | 1/2001 | Nelson et al. | 277/619 |
| 6,189,716 B1 | | 2/2001 | Lawrukovich et al. | |
| 6,206,432 B1 | | 3/2001 | Kamiyama | |
| 6,312,020 B1 | | 11/2001 | Ketcham et al. | |
| 6,490,964 B2 | | 12/2002 | Buynacek | |
| 6,543,746 B2 | | 4/2003 | Bircann et al. | |
| 6,588,317 B2 | | 7/2003 | Petin et al. | |

FOREIGN PATENT DOCUMENTS

| | | | |
|---|---|---|---|
| EP | 0 350 068 B1 | 3/1993 | B60K/17/35 |
| EP | 0 566 101 B1 | 9/1996 | G05D/23/02 |
| EP | 0 665 400 B1 | 9/1998 | F16L/37/00 |

* cited by examiner

Primary Examiner—Alison K. Pickard
(74) Attorney, Agent, or Firm—Jimmy L. Funke

(57) ABSTRACT

A seal assembly for a shaft has a flange fixed to a work piece having a bore hole therein. The flange encircles the shaft and includes a triangular shaped projecting member having first and second surfaces extending from the flange into the bore hole. An angle is formed between the first and second surface. The first surface of the projecting member is in contact with an inner surface of the bore hole or the outer surface of the shaft. An o-ring encircles the shaft and a backup ring is positioned within a space between the shaft, the flange and the o-ring or between the bore hole, the flange and the o-ring. Subject to axial forces, the backup ring undergoes a wedging action between the shaft and the triangular shaped projecting member or between the bore hole and the triangular member to seal where the shaft penetrates the work piece.

10 Claims, 4 Drawing Sheets

US 6,758,478 B1

ELASTOMERIC SEAL ANTI-EXTRUSION WEDGE BACKUP RING AND FLANGE

TECHNICAL FIELD

This disclosure relates to an anti-extrusion seal assembly, and more particularly to such an assembly utilizing a backup ring and flange wedge assembly.

BACKGROUND OF THE INVENTION

In a seal assembly for mating metal surfaces, for example where a shaft penetrates a pressure vessel, backup rings are installed on the low pressure side of an o-ring to help prevent leakage of a fluid. An o-ring functions as a seal through the mechanical deformation of an elastomeric compound. If the o-ring cannot resist increasingly higher pressures or if clearances in the seal assembly are too great, the o-ring may extrude into the clearances in the seal assembly. Backup rings are used to block the clearances and to provide axial support for the o-ring. Materials 'such as leather, polytetra-flouroethylene (PTFE, TEFLON®), nylon or other similar materials are used on anti-extrusion devices. However, these devices must be manufactured dimensionally to meet radial clearances required to prevent seal extrusion while under operating pressures.

Thus, it would be advantageous to provide an anti-extrusion seal assembly where the components thereof can be manufactured with wider radial tolerances while not compromising ability of the seal assembly to prevent 'seal extrusion or where large insertion forces or interference conditions are not needed, facilitating installation and minimizing the resulting component eccentricity.

SUMMARY OF THE INVENTION

A seal assembly for a shaft is disclosed. The seal assembly comprises a flange fixed to a work piece having a bore hole therein. The bore hole is receptive of the shaft. The flange encircles the shaft and includes a generally triangular shaped projecting member having a first surface extending from the flange into the bore hole parallel to the centerline thereof and in contact with an inner surface of the bore hole. A second surface extends from the flange into the bore hole at an angle to the centerline thereof and joins the first surface. The flange also includes a landing surface perpendicular to the centerline of the borehole. The triangular shaped projecting member defines an annular space between the shaft, the landing surface and the second surface of the triangular shaped projecting member. A backup ring encircles the shaft and is positioned within the space defined between the shaft, the landing surface and the second surface of the triangular shaped projecting member. The backup ring makes contact with the second surface of the triangular shaped projecting member. The backup ring has a trapezoidal cross section which includes a flat third surface parallel to the landing surface, an opposing concaved fourth surface having a curvature directed away from the third surface and an angled fifth surface contiguous, and in slidable contact, with the second surface.

A first variable clearance is defined between an inner surface of the backup ring and an outer surface of the shaft or the surface of the bore hole. A second variable clearance is defined between the third surface of the backup ring and the landing surface of the flange. An o-ring encircles the shaft so as to be in physical contact with the shaft, the backup ring and the bore hole and is positioned Within the curvature of the concaved surface.

DESCRIPTION OF THE DRAWINGS

Reference is made to the drawings wherein like elements and features are numbered alike and wherein.

DESCRIPTION OF THE PREFERRED EMBODIMENTS

Figure 1:
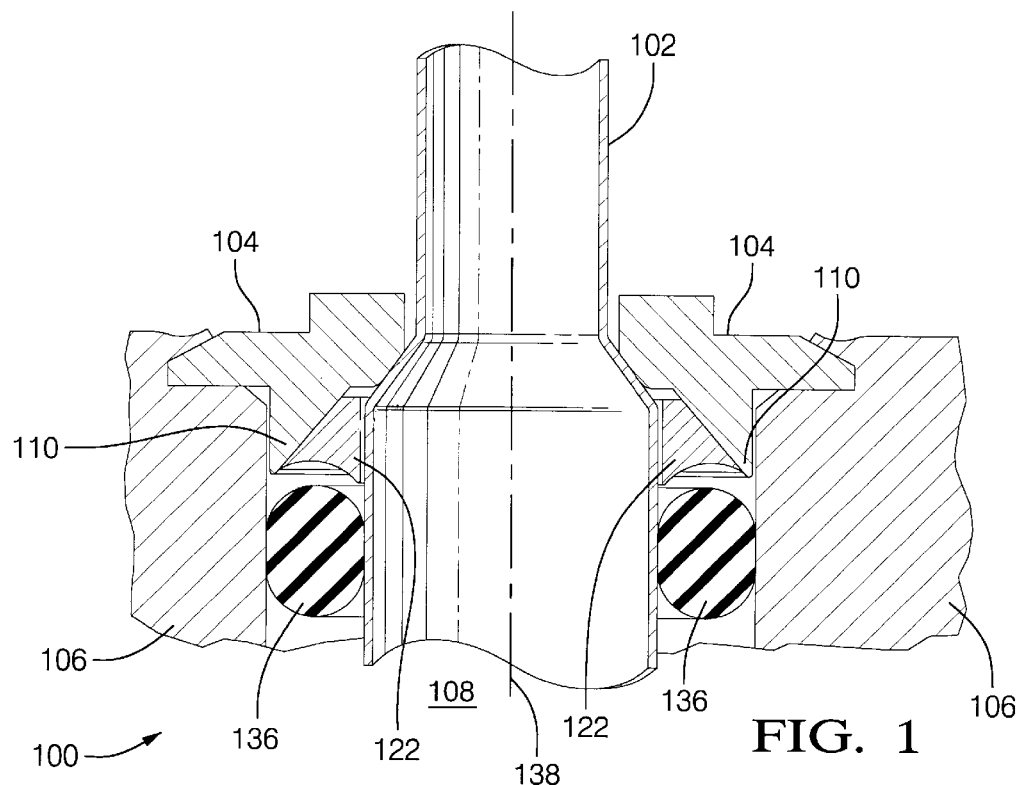
FIG. 1 is a cross sectional view of a seal assembly for a shaft.
Figure 2:
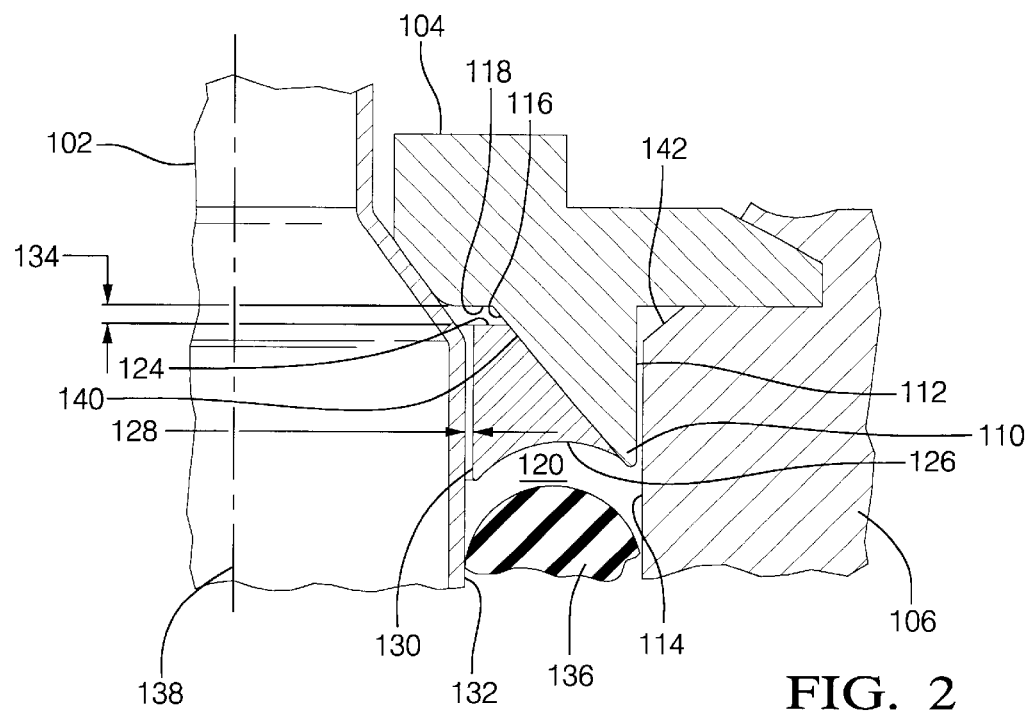
FIG. 2 is an enlarged segment of the cross sectional view of the seal assembly of FIG. 1.
Figure 3:
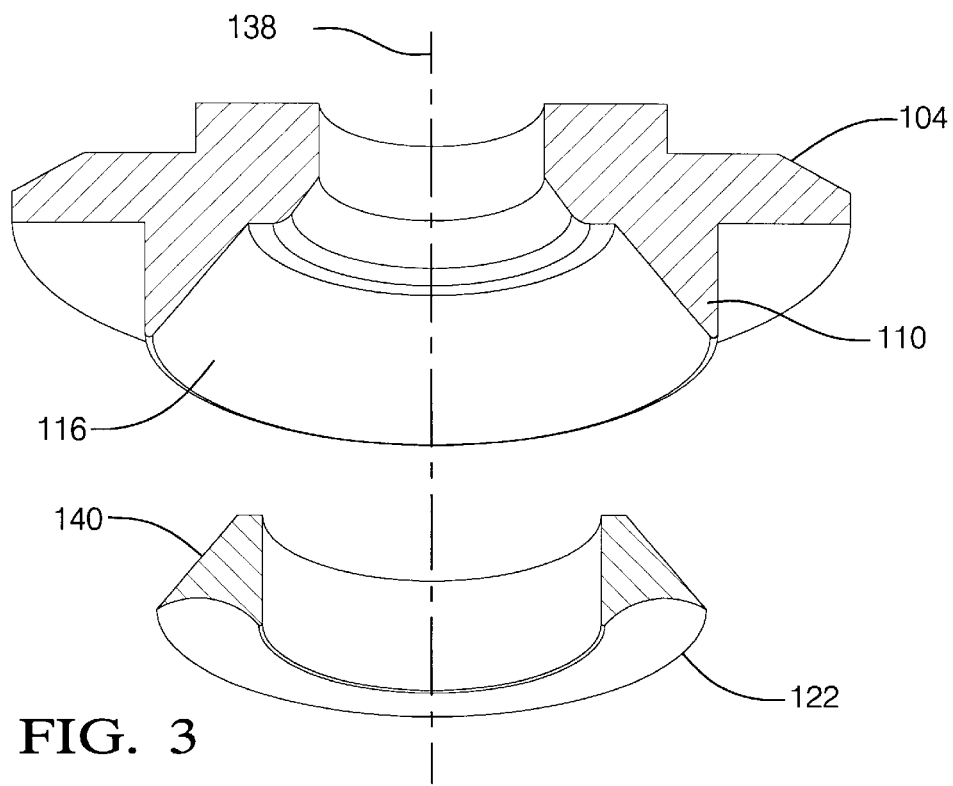
FIG. 3 is a three dimensional sectional view of a flange and backup ring of the seal assembly of FIGS. 1 and 2.

A description of the preferred embodiments of the present invention will now be had, by way of exemplification and not limitation, with reference to FIGS. 1–5. Referring to FIG. 1, a cross sectional view of a seal assembly for a shaft 102 is shown generally at 100. The seal assembly 100 comprises a flange 104 fixed to a work piece 106 such as a pressure vessel having a bore hole 108 therein. The bore hole 108 is receptive of the shaft 102 along a common axis 138. The flange 104 encircles the shaft 102 and includes a generally triangular shaped projecting member 110 or stub (FIG. 2) having a first surface 112 extending from the flange 104 into the bore hole 108 parallel to the axis 138. The first surface 112 of the triangular shaped projecting member 110 is manufactured to be in contact with an inner surface 114 of the bore hole 108 or to have a clearance 146 (FIG. 5) therewith that conforms to elastomer seal anti-extrusion design standards. The work piece 106 includes a lead-in chamfer 142 to allow the triangular shaped projecting member 110 to be fitted within the bore hole 108. The primary purpose of the lead-in chamfer 142 is to allow the o-ring 136 to be squeezed into an o-ring gland 120 (or annular space), although the chamfer 142 also helps guide the triangular shaped projecting member 110 into the bore hole 108. The triangular shaped projecting member 110 also includes a second surface 116 extending from the flange 104 into the bore hole 108 and forming an angle, α, with the first surface 112. The angle α is dependent upon the geometric relation between the space available for the backup ring and the axial to radial displacement necessary to meet anti-extrusion clearance requirements at 128 based upon application pressure requirements. Application pressure requirements are the operating pressures that the seal assembly must be able to withstand before extrusion begins. However, this does not necessarily imply that o-ring extrusion will occur at this pressure. It is the operating pressure that the seal assembly will see, below which prevention of o-ring extrusion is sought. The second surface 116 joins the first surface 112 to form the triangular cross section. The flange 104 includes a landing surface 118 facing the bore hole 108 and perpendicular to the axis 138 of the borehole 108. The triangular shaped projecting member 110 defines a gland 120 between the shaft 102, the landing surface 118 and the second surface 116 of the triangular shaped projecting member 110.

Continuing in FIG. 1, a backup ring 122 encircles the shaft 102 and is positioned within the gland 120 defined between the shaft 102, the landing surface 118 and the second surface 116 of the triangular shaped projecting member 110. The backup ring 122 has a generally trapezoidal cross section which includes a flat third surface 124 parallel to the landing surface 118, an opposing concaved fourth surface 126 having a curvature directed away from the third surface 124, a flat fifth inner surface parallel to the first surface 112 and an angled sixth surface 140 parallel to and in slidable contact with, the second surface 116 of the triangular shaped projecting member 110.

A first variable clearance 128 (FIGS. 2, 4 and 5) is defined between an inner surface 130 of the backup ring 122 and an outer surface 132 of the shaft 102. A second variable clearance 134 is defined between the third surface 124 of the backup ring 122 and the landing surface 118 of the flange 104.

Still further in FIG. 1, an elastomeric o-ring 136 encircles the shaft 102 so as to be in physical contact with the shaft 102, the backup ring 122 and the bore hole 108 and positioned within the curvature of the concaved surface 126.

Figure 4:
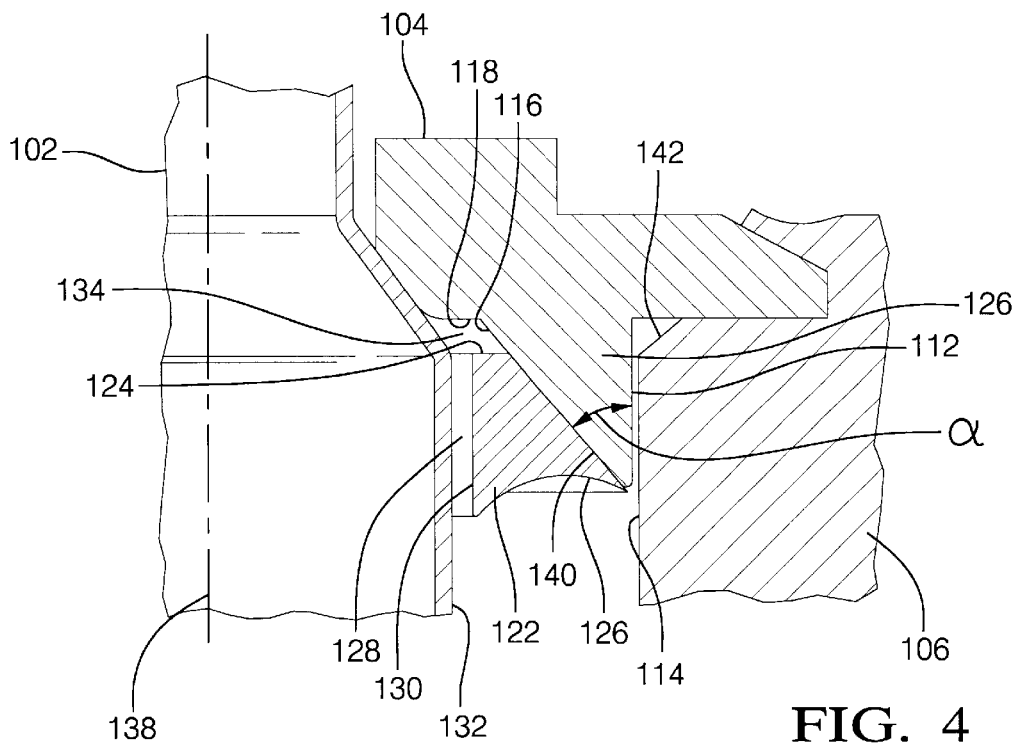
FIG. 4 is an enlarged segment of the cross sectional view of the seal assembly of FIG. 1 in an initial position.
Figure 5:
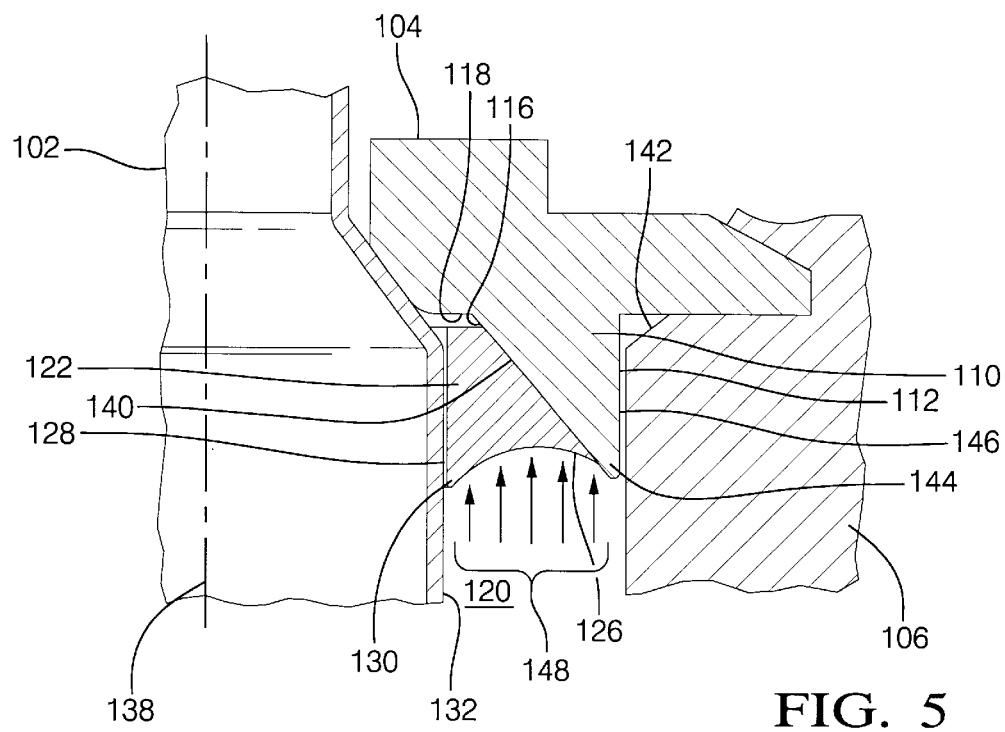
FIG. 5 is an enlarged segment of the cross sectional view of the seal assembly of FIG. 1 in a final position.

FIG. 4 shows an enlarged segment of the cross sectional view of the seal assembly of FIG. 1 in an initial position when not subject to operating pressures. FIG. 5 shows an enlarged segment of the cross sectional view of the seal assembly of FIG. 1 in a final position when subject to operating pressures. As axial forces 148 are applied to the o-ring 136, the o-ring 136 moves in a direction parallel with the axis 138 until the o-ring 136 makes contact with the backup ring 122 at the concaved surface 126. The movement of the o-ring 136 is thus transferred to the backup ring 122. The backup ring 122 moves in a direction parallel with the axis 138 until the first 128 and second 134 variable clearances are reduced to or very nearly zero, whereby the inner surface 130 of the backup ring 122 is flush with the outer surface 132 of the shaft 102, and the third surface 124 of the backup ring 122 is flush with the landing surface 118. As best understood, the condition whereby the third surface 124 of the backup ring 122 is flush with the landing surface 118, does not have to be met. It will help absorb some of the axial forces when the o-ring 136 is being inserted into the gland 120 especially when the backup ring 122 is packaged on the OD of the flange as in FIGS. 6 and 7. When the backup ring 122 is packaged on the flange OD there is the possibility that the backup ring 122 can be pushed into the lead-in angle area 142, especially if this area is large relative to the size of the cross-section of the back up ring 122. This is also an additional feature that will help prevent the backup ring 122 from moving axially after the radial clearance 128 has been eliminated. Thus a seal is provided between the shaft 102 and the work piece 106. In so moving, a "wedging" action takes place between the backup ring 122 and the triangular shaped projecting member 110 whereby the angled sixth surface 140 of the backup ring 122 slides along the second surface 116 of the triangular shaped projecting member 110 until the aforesaid first 128 and second 134 variable clearances approach or reach zero (see FIG. 3). The wedging action produces an axial force on the backup ring 122 by the o-ring 136, which in turn results in a radial force acting on the backup ring 122 so as to reduce or eliminate the radial clearance at 128 and the axial clearance at 134 in FIGS. 2 and 4.

Figure 6:
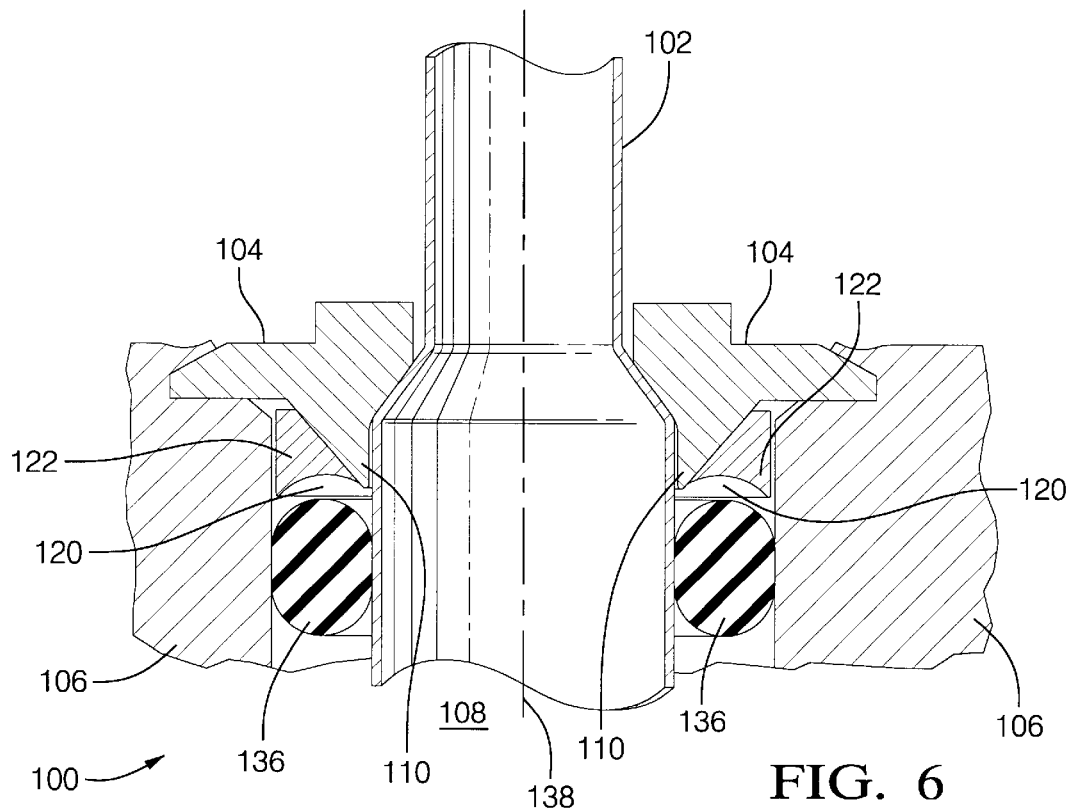
FIG. 6 is a cross sectional view of a seal assembly for a shaft.
Figure 7:
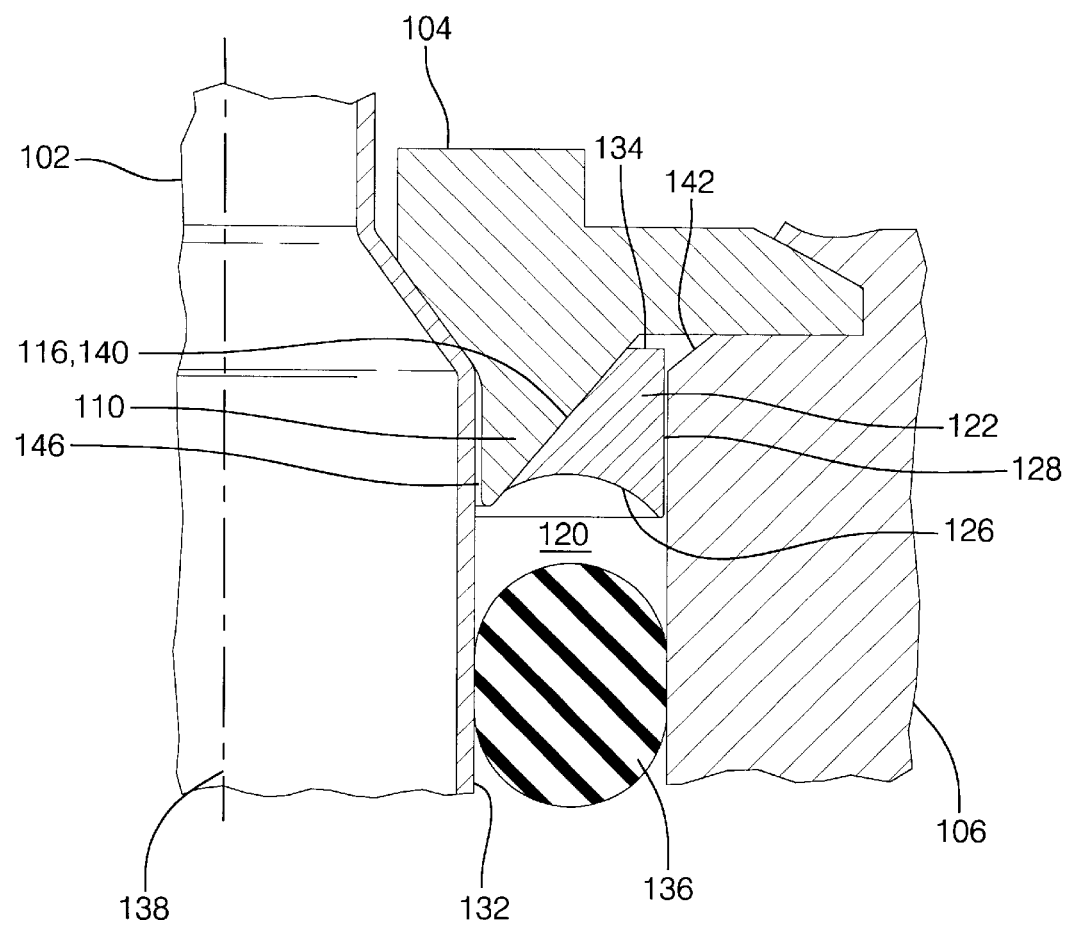
FIG. 7 is an enlarged segment of the cross sectional view of the seal assembly of FIG. 6.

Referring to FIGS. 6 and 7 an alternate embodiment of the seal assembly is shown. The first surface 112 of the triangular shaped projecting member 110 is now manufactured to be in contact with the outer surface 132 of the shaft 102 or to have a clearance 146 (FIG. 7) therewith that conforms to elastomer seal anti-extrusion design standards. Thus, the arrangement of the triangular shaped projecting member 110 and backup ring 122 of the alternate embodiment of the seal assembly in FIGS. 6 and 7 is reversed from that shown in FIGS. 1, 2, 4 and 5. However, the wedging action described above is still essentially the same in that as axial forces 148 are applied to the o-ring 136, the o-ring 136 moves in a direction parallel with the axis 138 until the o-ring 136 makes contact with the backup ring 122 at the concaved surface 126. The movement of the o-ring 136 is thus transferred to the backup ring 122. The backup ring 122 moves in a direction parallel with the common axis 138 until the first 128 and second 134 variable clearances are reduced to or very nearly zero, whereby an outer surface 150 of the backup ring 122 is flush with the surface 114 of the bore hole 108, and the third surface 124 of the backup ring 122 is flush with the landing surface 118 of the flange 104, thus providing a seal for the shaft 102 in the work piece 106. In so moving, a "wedging" action takes place between the backup ring 122 and the triangular shaped projecting member 110 whereby the angled sixth surface 140 of the backup ring 122 slides along the second surface 116 of the triangular shaped projecting member 110 until the aforesaid first 128 and second 134 variable clearances approach or reach zero (see FIG. 7). The wedging action produces an axial force on the backup ring 122 by the o-ring 136, which in turn results in a outward radial force acting on the backup ring 122 so as to reduce or eliminate the radial clearance at 128 and the axial clearance at 134 in FIG. 7.

Thus, based upon the foregoing description, a seal assembly for a shaft is disclosed which has a flange fixed to a work piece having a bore hole therein. The flange encircles the shaft and includes a triangular shaped projecting member having first and second surfaces extending from the flange into the bore hole. An angle is formed between the first and second surface. The first surface of the projecting member is in contact with an inner surface of the bore hole or the outer surface of the shaft. An o-ring encircles the shaft and a backup ring is positioned within a gland between the shaft, the flange and the o-ring or between the bore hole, the flange and the o-ring. Subject to axial forces, the backup ring undergoes a wedging action between the shaft and the triangular shaped projecting member or between the bore hole and the triangular member to seal where the shaft penetrates the work piece.

The back up ring supports the o-ring axially to prevent extrusion of the o-ring through the seal assembly gland. The o-ring accommodates any radial clearances which can lead to extrusion of the o-ring. The back up ring will collapse or crush during assembly to absorb that part of the component radial dimensional stack that would otherwise not meet radial clearances required to prevent extrusion of the o-ring. With the wedged flange and back up ring design, radial clearances can be met with higher component radial stack limits. The wedge design can be specified to the OD or ID of the o-ring depending upon where the larger radial clearance exists. Under high pressures, the o-ring will exert an axial force against the backup ring, forcing the back up ring against the triangular cross section (i.e., the wedging mechanism) of the flange, which thereby exerts a radial force on the backup ring reducing or eliminating the extrusion clearance.

Such a seal assembly reduces the cost of the seal due to less stringent component dimensional requirements. Furthermore, the seal assembly allows for a more robust design for elastomer and is an effective solution when the component radial stack limits will not meet o-ring anti-extrusion requirements (i.e., when the OD on deep drawn components are drawn with controlled ID's).

As best understood, this invention can be used in any applications which currently use o-ring seals. Its usefulness increases in applications that require seal assemblies with low durometer o-rings and that have high pressure differentials at the seal interface. Some examples are Antilock Brake System actuators, sensors, pump pistons, as well as in Diesel pressure control actuator seals, and high pressure industrial equipment.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting to the claims.

What the claimed is:

1. A seal assembly for sealing a penetration in the surface of a workpiece by a shaft, the seal assembly comprising:

a flange fixed to the work piece having a bore hole therein, the bore hole receptive of the shaft along a common axis;

wherein the flange encircles the shaft and includes:
        a projecting member having a first surface extending from the flange into the bore hole parallel to the axis and a second surface extending from the flange into the bore hole forming thereby an angle, α, with the first surface, and
        a landing surface perpendicular to the axis;
        wherein the projecting member defines an annular space between the shaft, the landing surface and the second surface of the projecting member;
        a backup ring encircling the shaft and positioned within the annular space;
        the backup ring having a third surface parallel to the landing surface, an opposing concaved fourth surface having a curvature directed away from the third surface, a fifth surface parallel to the first surface and an angled sixth surface parallel to and in slidable contact with, the second surface;
        wherein a first variable clearance is defined between the fifth surface of the backup ring and an outer surface of the shaft, and a second variable clearance is defined between the third surface of the backup ring and the landing surface of the flange; and
        an o-ring encircling the shaft so as to be in physical contact with the shaft, the backup ring and the bore hole and positioned within the curvature of the concaved surface;
        wherein when subject to axial forces the backup ring moves along the axis and slides along the second surface of the projecting member to form a wedge in the annular space thereby minimizing the first and second variable clearances.

2. The seal assembly as set forth in claim 1 wherein the backup ring comprises nylon.

3. The seal assembly as set forth in claim 1 wherein the o-ring comprises an elastomer.

4. The seal assembly as set forth in claim 1 wherein the projecting member is a triangular shaped member in cross section.

5. The seal assembly as set forth in claim 1 wherein the first surface of the projecting member is in contact with a surface of the bore hole.

6. A seal assembly for sealing a penetration in the surface of a workpiece by a shaft, the seal assembly comprising:

a flange fixed to the work piece having a bore hole therein, the bore hole receptive of the shaft along a common axis;

wherein the flange encircles the shaft and includes:
        a projecting member having a first surface extending from the flange into the bore hole parallel to the axis and a second surface extending from the flange into the bore hole forming thereby an angle, α, with the first surface; and
        a landing surface perpendicular to the axis;
        wherein the projecting member defines an annular space between the bore hole, the landing surface and the second surface of the projecting member;
        a backup ring encircling the shaft and positioned within the annular space;
        the backup ring having a third surface parallel to the landing surface, an opposing concaved fourth surface having a curvature directed away from the third surface, a fifth surface parallel to the first surface and an angled sixth surface parallel to and in slidable contact with, the second surface;
        wherein a first variable clearance is defined between the fifth surface of the backup ring and the surface of the bore hole, and a second variable clearance is defined between the third surface of the backup ring and the landing surface of the flange; and
        an o-ring encircling the shaft so as to be in physical contact with the shaft, the backup ring and the bore hole and positioned within the curvature of the concaved surface;
        wherein when subject to axial forces the backup ring moves along the axis and slides along the second surface of the projecting member to form a wedge in the annular space thereby minimizing the first and second variable clearances.

7. The seal assembly as set forth in claim 6 wherein the backup ring comprises nylon.

8. The seal assembly as set forth in claim 6 wherein the o-ring comprises an elastomer.

9. The seal assembly as set forth in claim 6 wherein the projecting member is a triangular shaped member in cross section.

10. The seal assembly as set forth in claim 6 wherein the first surface of the projecting member is in contact with an outer surface of the shaft.

* * * * *